United States Patent
Neumeier et al.

(10) Patent No.: US 9,071,868 B2
(45) Date of Patent: Jun. 30, 2015

(54) SYSTEMS AND METHODS FOR IMPROVING SERVER AND CLIENT PERFORMANCE IN FINGERPRINT ACR SYSTEMS

(71) Applicants: Zeev Neumeier, Berkeley, CA (US); Brian Reed, Stamford, CT (US)

(72) Inventors: Zeev Neumeier, Berkeley, CA (US); Brian Reed, Stamford, CT (US)

(73) Assignee: Cognitive Networks, Inc., San Francisco, CA (US)

( * ) Notice: Subject to any disclaimer, the term of this patent is extended or adjusted under 35 U.S.C. 154(b) by 0 days.

(21) Appl. No.: 14/217,425

(22) Filed: Mar. 17, 2014

(65) Prior Publication Data

US 2014/0201787 A1   Jul. 17, 2014

Related U.S. Application Data

(63) Continuation-in-part of application No. 14/089,003, filed on Nov. 25, 2013, now Pat. No. 8,898,714, and a (Continued)

(51) Int. Cl.

| | |
|---|---|
| *H04H 60/33* | (2008.01) |
| *H04N 21/44* | (2011.01) |
| *H04N 21/442* | (2011.01) |
| *H04N 21/81* | (2011.01) |
| *H04N 5/445* | (2011.01) |
| *H04N 21/45* | (2011.01) |
| *H04N 21/462* | (2011.01) |
| *H04N 21/466* | (2011.01) |
| *H04N 21/478* | (2011.01) |

(52) U.S. Cl.
CPC ... *H04N 21/44008* (2013.01); *H04N 21/44204* (2013.01); *H04N 21/8126* (2013.01); *H04N 5/44591* (2013.01); *H04N 21/4532* (2013.01); *H04N 21/462* (2013.01); *H04N 21/4667* (2013.01); *H04N 21/478* (2013.01)

(58) Field of Classification Search
CPC ............. H04N 21/44008; H04N 21/44204; H04H 60/59; H04H 60/29
See application file for complete search history.

(56) References Cited

U.S. PATENT DOCUMENTS

| | | | | |
|---|---|---|---|---|
| 4,677,466 A | * | 6/1987 | Lert et al. | 725/22 |
| 4,697,209 A | * | 9/1987 | Kiewit et al. | 725/19 |
| 4,739,398 A | * | 4/1988 | Thomas et al. | 725/22 |
| 5,436,653 A | * | 7/1995 | Ellis et al. | 725/22 |

(Continued)

*Primary Examiner* — Pankaj Kumar
*Assistant Examiner* — Timothy Newlin
(74) *Attorney, Agent, or Firm* — Puget Patent; Michael Gibbons

(57) ABSTRACT

A system and method are disclosed that improve the efficiency and performance of an Automatic Content Recognition (ACR) system. Several approaches are described that may be used alone or in combination to reduce total system computational costs related to the manner in which such an ACR means takes samples, called "fingerprints," of digital content being played by a television display device and transmits said fingerprints to a remote server to be compared to a database of fingerprints from known programming. Methods are described for implementing such system performance enhancement including varying sampling rates and other resolution metrics during the process of creating such fingerprints and transmitting them to the database server. The system and method disclosed also describes how to reduce the probability that, when compared to samples from already-identified programming, such fingerprints are incorrectly identified as being of programming other than that which they are in fact derived from.

39 Claims, 10 Drawing Sheets

Related U.S. Application Data continuation-in-part of application No. 12/788,721, filed on May 27, 2010, now Pat. No. 8,595,781, and a continuation-in-part of application No. 12/788,748, filed on May 27, 2010, now Pat. No. 8,769,584, and a continuation-in-part of application No. 14/217,039, filed on Mar. 17, 2014, and a continuation-in-part of application No. 14/217,075, filed on Mar. 17, 2014, and a continuation-in-part of application No. 14/217,094, filed on Mar. 17, 2014, now Pat. No. 8,930,980, and a continuation-in-part of application No. 14/217,375, filed on Mar. 17, 2014, and a continuation-in-part of application No. 14/217,435, filed on Mar. 17, 2014.

(60) Provisional application No. 61/290,714, filed on Dec. 29, 2009, provisional application No. 61/182,334, filed on May 29, 2009, provisional application No. 61/791,578, filed on Mar. 15, 2013.

(56) References Cited

U.S. PATENT DOCUMENTS

| | | | |
|---|---|---|---|
| 5,481,294 A * | 1/1996 | Thomas et al. | 725/20 |
| 6,771,316 B1 * | 8/2004 | Iggulden | 348/553 |
| 2002/0054695 A1 * | 5/2002 | Bjorn et al. | 382/124 |
| 2002/0059633 A1 * | 5/2002 | Harkness et al. | 725/108 |
| 2002/0120925 A1 * | 8/2002 | Logan | 725/9 |
| 2003/0026422 A1 * | 2/2003 | Gerheim et al. | 380/210 |
| 2005/0066352 A1 * | 3/2005 | Herley | 725/19 |
| 2007/0050832 A1 * | 3/2007 | Wright et al. | 725/115 |
| 2008/0089551 A1 * | 4/2008 | Heather et al. | 382/100 |
| 2008/0263620 A1 * | 10/2008 | Berkvens et al. | 725/136 |
| 2010/0115543 A1 * | 5/2010 | Falcon | 725/19 |
| 2011/0026761 A1 * | 2/2011 | Radhakrishnan et al. | 382/100 |

* cited by examiner

Fig. 4

316 Adjusting one or more values related to transmitting fingerprints based at least partially on whether the at least one of the identified channel or the identified video segment is at least one of a channel of interest or a video segment of interest

402 Determining whether the at least one of the identified channel or the identified video segment is at least one of a channel of interest or a video segment of interest and, if the at least one of the identified channel or the identified video segment is at least one of a channel of interest or a video segment of interest, adjusting one or more values related to transmitting fingerprints wherein the adjusted one or more values are operable to transmit fingerprint packages enabling ACR detection sufficiently fast for providing at least some context-sensitive content substantially simultaneously with at least one targeted video

404 Determining whether the at least one of the identified channel or the identified video segment is at least one of a channel of interest or a video segment of interest and, if the at least one of the identified channel or the identified video segment is not at least one of a channel of interest or a video segment of interest, adjusting one or more values related to transmitting fingerprints wherein the adjusted one or more values are operable to transmit fingerprint packages enabling ACR detection sufficiently fast for detecting a channel to which the client is changed within at least one time proximity of the change of channel

406 Determining whether the at least one of the identified channel or the identified video segment is at least one of a channel of interest or a video segment of interest and, if the at least one of the identified channel or the identified video segment is not at least one of a channel of interest or a video segment of interest, adjusting one or more values related to transmitting fingerprints wherein the adjusted one or more values are operable to at least one of halt or slow transmission of fingerprint packages until a channel change occurs

Fig. 5

316 Adjusting one or more values related to transmitting fingerprints based at least partially on whether the at least one of the identified channel or the identified video segment is at least one of a channel of interest or a video segment of interest 502 Determining whether the at least one of the identified channel or the identified video segment is at least one of a channel of interest or a video segment of interest and, if the at least one of the identified channel or the identified video segment is not at least one of a channel of interest or a video segment of interest, adjusting one or more values related to transmitting fingerprints wherein the adjusted one or more values are operable to at least one of halt or slow transmission of fingerprint packages until a trigger time for an expected video segment of interest occurs 504 Determining whether the at least one of the identified channel or the identified video segment is at least one of a channel of interest or a video segment of interest and, if the at least one of the identified channel or the identified video segment is not at least one of a channel of interest or a video segment of interest, adjusting one or more values related to transmitting fingerprints wherein the adjusted one or more values are operable to at least one of halt or slow transmission of fingerprint packages until a detection of an ad pod occurs 506 Determining whether the at least one of the identified channel or the identified video segment is at least one of a channel of interest or a video segment of interest and, if the at least one of the identified channel or the identified video segment is not at least one of a channel of interest or a video segment of interest, adjusting one or more values related to transmitting fingerprints wherein the adjusted one or more values are operable to at least one of halt or slow transmission of fingerprint packages until a detection of a video segment of interest is detected by an ingest system associated with the ACR system

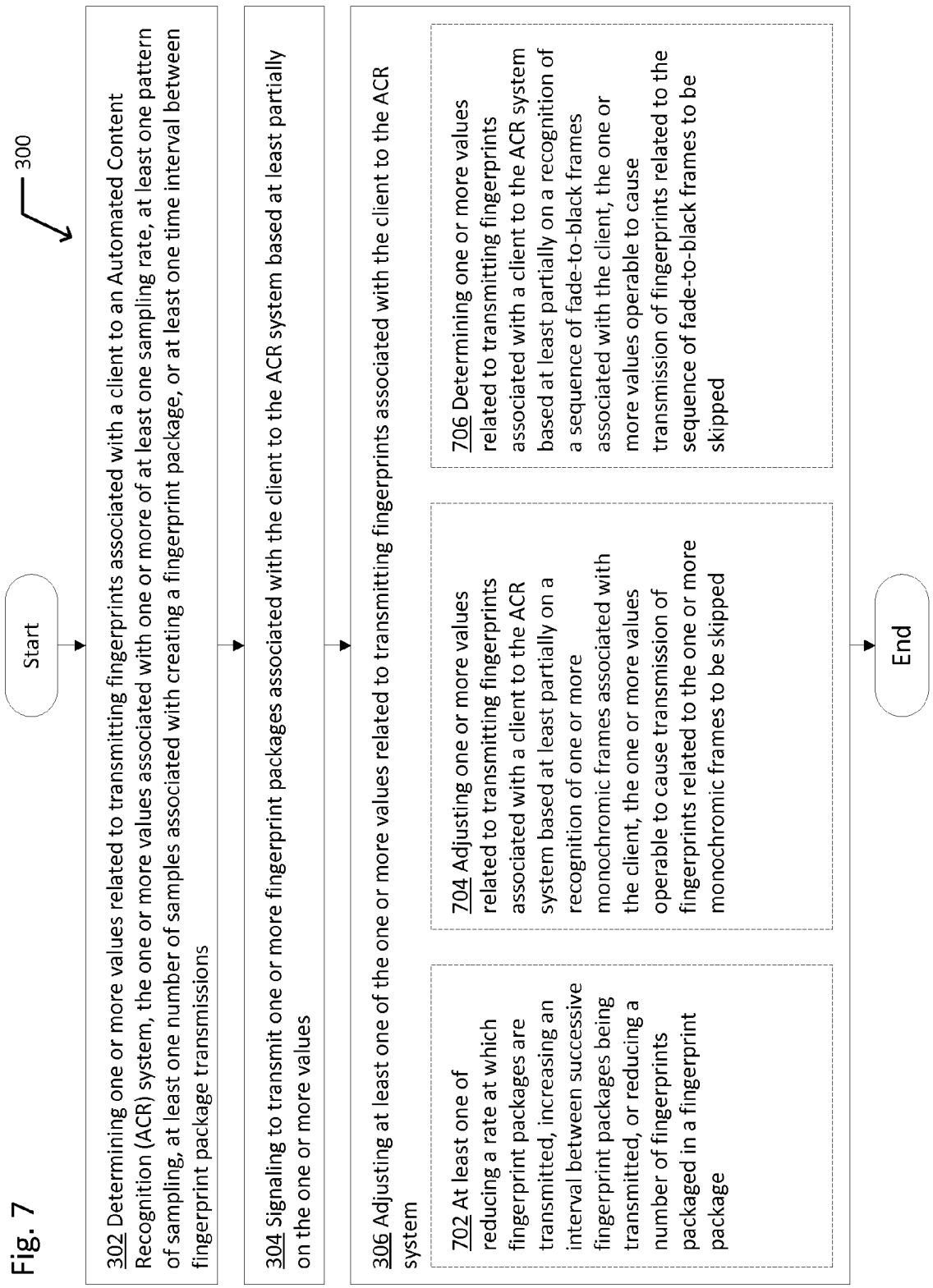

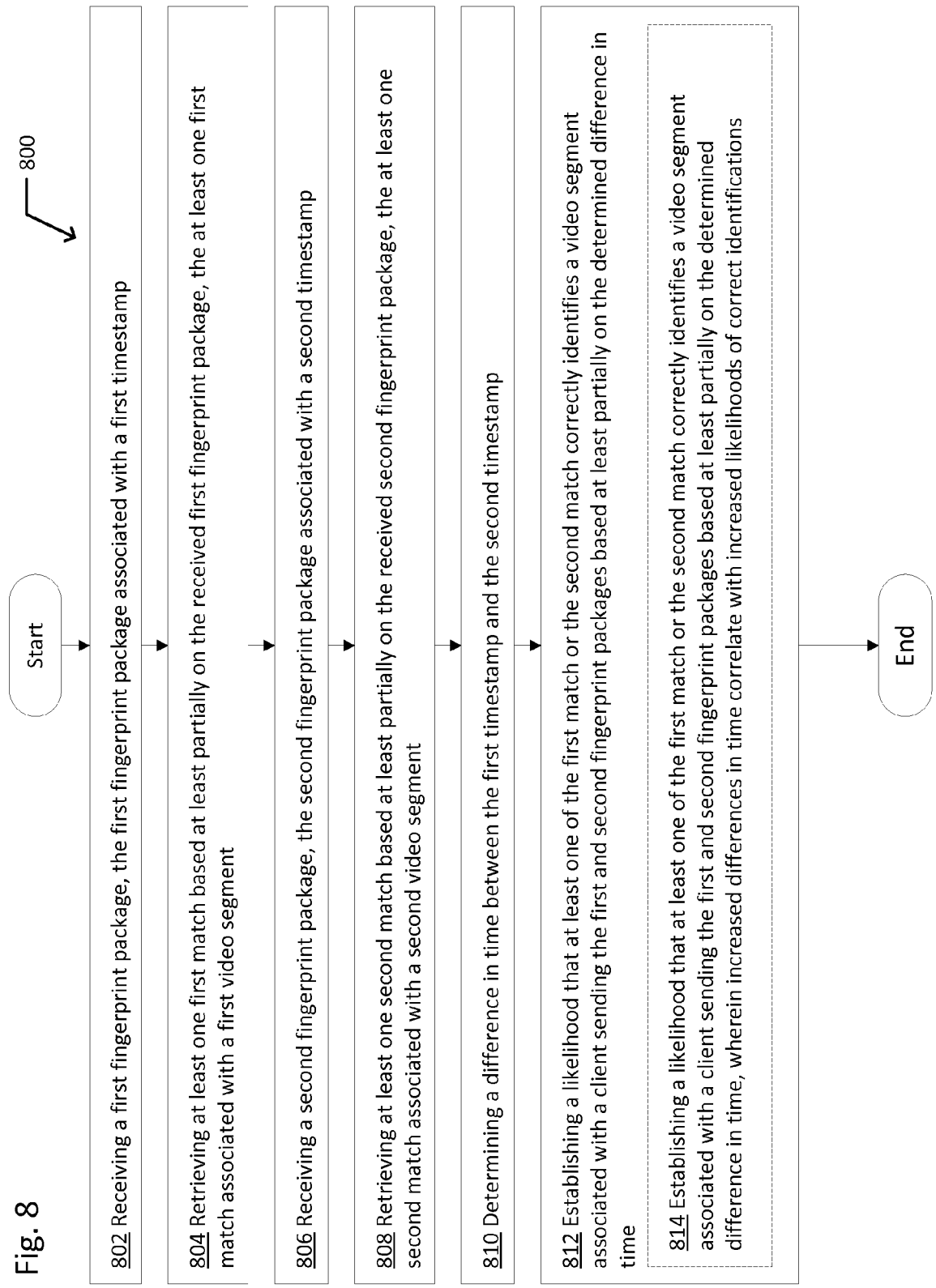

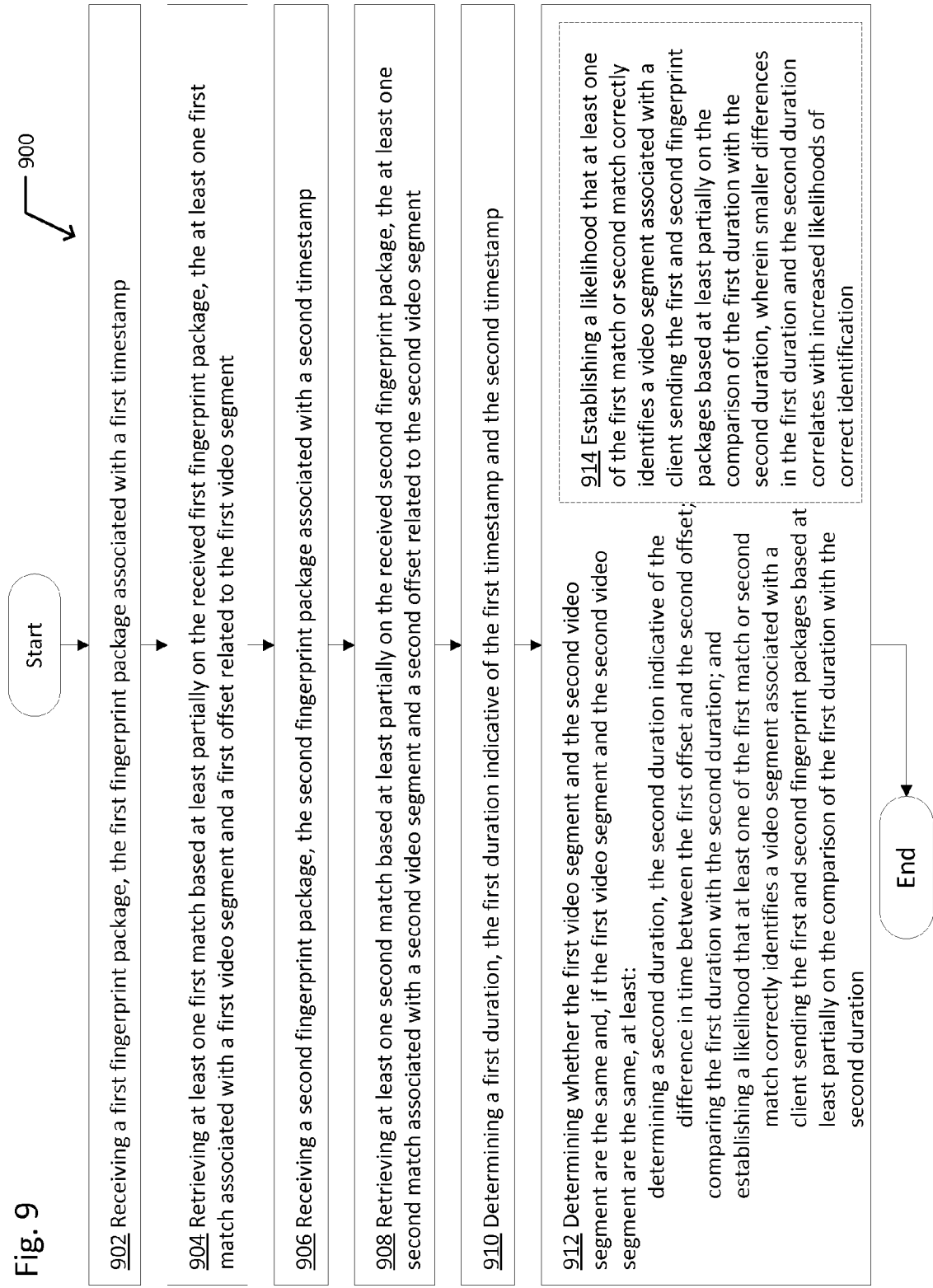

Fig. 10

1000 At least one non-transitory computer-readable medium

1002 One or more instructions for:
(a) determining one or more values related to transmitting fingerprints associated with a client to an Automated Content Recognition (ACR) system, the one or more values associated with one or more of at least one sampling rate, at least one pattern of sampling, at least one number of samples associated with creating a fingerprint package, or at least one time interval between fingerprint package transmissions;
(b) signaling to transmit one or more fingerprint packages associated with a client to an ACR system based at least partially on one or more values related to transmitting fingerprints; and
(c) adjusting at least one of one or more values related to transmitting fingerprints associated with the client to the ACR system

Fig. 11

1100 A system

1102 Circuitry configured for determining one or more values related to transmitting fingerprints associated with a client to an Automated Content Recognition (ACR) system, the one or more values associated with one or more of at least one sampling rate, at least one pattern of sampling, at least one number of samples associated with creating a fingerprint package, or at least one time interval between fingerprint package transmissions 1104 Circuitry configured for signaling to transmit one or more fingerprint packages associated with the client to the ACR system based at least partially on one or more values related to transmitting fingerprints 1106 Circuitry configured for adjusting at least one of one or more values related to transmitting fingerprints associated with the client to the ACR system

SYSTEMS AND METHODS FOR IMPROVING SERVER AND CLIENT PERFORMANCE IN FINGERPRINT ACR SYSTEMS

PRIORITY CLAIM

This application constitutes a continuation-in-part of U.S. patent application Ser. No. 12/788,721, entitled "METHODS FOR IDENTIFYING VIDEO SEGMENTS AND DISPLAYING CONTEXTUAL TARGETED CONTENT ON A CONNECTED TELEVISION," filed May 27, 2010, and issued Nov. 6, 2013 as U.S. Pat. No. 8,595,781, that application being a non-provisional application claiming priority from U.S. Provisional Patent Application No. 61/182,334, entitled "SYSTEM FOR PROCESSING CONTENT INFORMATION IN A TELEVIDEO SIGNAL," filed May 29, 2009 and being a non-provisional application claiming priority from U.S. Provisional Patent Application No. 61/290,714, entitled "CONTEXTUAL TARGETING BASED ON DATA RECEIVED FROM A TELEVISION SYSTEM," filed Dec. 29, 2009; this application further constitutes a continuation-in-part of U.S. patent application Ser. No. 12/788,748, entitled "METHODS FOR DISPLAYING CONTEXTUALLY TARGETED CONTENT ON A CONNECTED TELEVISION," filed May 27, 2010; this application further constitutes a continuation-in-part of U.S. patent application Ser. No. 14/089,003, entitled "METHODS FOR IDENTIFYING VIDEO SEGMENTS AND DISPLAYING CONTEXTUALLY TARGETED CONTENT ON A CONNECTED TELEVISION," filed Nov. 25, 2013; this application further constitutes a continuation-in-part of U.S. patent application Ser. No. 14/217,039, entitled "SYSTEMS AND METHODS FOR ADDRESSING A MEDIA DATABASE USING DISTANCE ASSOCIATIVE HASHING," filed Mar. 17, 2014; this application further constitutes a continuation-in-part of U.S. patent application Ser. No. 14/217,075, entitled "SYSTEMS AND METHODS FOR IDENTIFYING VIDEO SEGMENTS FOR DISPLAYING CONTEXTUALLY RELEVANT CONTENT," filed Mar. 17, 2014; this application further constitutes a continuation-in-part of U.S. patent application Ser. No. 14/217,094, entitled "SYSTEMS AND METHODS FOR REAL-TIME TELEVISION AD DETECTION USING AN AUTOMATED CONTENT RECOGNITION DATABASE," filed Mar. 17, 2014; this application further constitutes a continuation-in-part of U.S. patent application Ser. No. 14/217,375, entitled "SYSTEMS AND METHODS FOR ON-SCREEN GRAPHICS DETECTION," filed Mar. 17, 2014; this application further constitutes a continuation-in-part of U.S. patent application Ser. No. 14/217,435, entitled "SYSTEMS AND METHODS FOR MULTI-BROADCAST DIFFERENTIATION," filed Mar. 17, 2014; and this application further constitutes a non-provisional application of U.S. Provisional Patent Application No. 61/791,578, entitled "SYSTEMS AND METHODS FOR IDENTIFYING VIDEO SEGMENTS BEING DISPLAYED ON REMOTELY LOCATED TELEVISIONS," filed Mar. 15, 2013. The foregoing applications are either currently co-pending or are applications of which a currently co-pending application is entitled to the benefit of the filing date.

FIELD OF THE INVENTION

The present invention relates to the field of digital video displays and various systems and methods for implementing Automatic Content Recognition systems.

BACKGROUND

A television display device equipped with significant associated data processing capability, often called a "Smart TV," can be configured to optimize a viewer's experience through the provision of contextually-relevant material. One example of this might include offering additional background information or special messages associated with the programming or commercial material being displayed at that moment. To accomplish this goal, the processing means within the TV device itself, or an associated device such as a set-top box needs to have real time "awareness" of what programming is being displayed on the TV screen at that moment.

There are currently two primary forms of automatic content recognition in use for enhanced TV experiences. One method is digital watermarking, and the other is content fingerprinting. The digital watermark method requires the broadcast content to be preprocessed so that the watermark data may be hidden within the content signal. That data is then detected by the TV processing means in order to enable identification and synchronization.

Another method of automated content recognition involves using audio or video content fingerprinting to identify the content signal as it is displayed by computing a sequence of content fingerprints and matching them with a database. While it does away with the need to have all content preprocessed, it is more challenging to identify audio or video programming with content fingerprinting, particularly if the system is intended to operate simultaneously across potentially hundreds of television program channels while dealing with a variety of user behavior such as channel changing, pausing or viewing time-shifted content that causes a loss of identification.

Therefore, for video content fingerprint-based ACR, a person skilled in the art might implement a solution requiring computational processing power, both at a centralized server or other computing means as well as within each local display device that is too costly to be commercially reasonable and practical. For example, the ACR system might be programmed to operate continuously on a video frame-by-frame basis in order to identify the program and track the relative time location within each show across a wide time range and for a large database of shows, while simultaneously needing to account for time-shifted content, channel surfing, or the like.

At most any point in time in the US market, there are several hundred program choices offered by most cable TV or satellite providers. In addition, there are over one hundred major television market areas with dozens of local television channels. On a national level, an ACR system must monitor thousands of unique television programs. The need for computational efficiency is clearly required in order for a system to operate reliably and at a commercially reasonable cost.

Despite continuing advances in computing power, automated matching of audio or video content remains a daunting task. Such "brute force" identification implies that the TV display device's processing means is continuously computing fingerprints and sending these fingerprints and other associated content signals to centralized fingerprint database for identification. Such as process would use an excessive amount of the computing resources of a typical smart TV; leaving little else for the other smart TV applications that a user may wish to utilize.

The challenge is even greater on a system level than at the local TV set because the centralized system must have sufficient computing power to handle simultaneous processing demands from potentially millions of TV sets. As noted in the detailed description below, the costs of memory and processing power needed to support each ACR system in the field can soon overwhelm the revenue being generated by each such system. Therefore a method to optimize these systems to make them commercially viable is a still unmet need for the operators of such systems. In addition, it has been found that improvements in the efficiency of these systems, also improves the accuracy of the content matching process.

SUMMARY

In some embodiments, an exemplary method related to improving server and client performance in fingerprint ACR systems may include determining one or more values related to transmitting fingerprints associated with a client to an Automated Content Recognition (ACR) system, the one or more values associated with one or more of at least one sampling rate, at least one pattern of sampling, at least one number of samples associated with creating a fingerprint package, or at least one time interval between fingerprint package transmissions; signaling to transmit one or more fingerprint packages associated with the client to the ACR system based at least partially on the one or more values; and adjusting at least one of the one or more values related to transmitting fingerprints associated with the client to the ACR system.

In some embodiments, determining one or more values related to transmitting fingerprints associated with a client to an Automated Content Recognition (ACR) system, the one or more values associated with one or more of at least one sampling rate, at least one pattern of sampling, at least one number of samples associated with creating a fingerprint package, or at least one time interval between fingerprint package transmissions may include determining the one or more values following at least one of a power-on condition, a change of channels, a fast-forward operation, a rewind operation, a pause operation, or a skip operation associated with the client. In some embodiments, determining one or more values related to transmitting fingerprints associated with a client to an Automated Content Recognition (ACR) system, the one or more values associated with one or more of at least one sampling rate, at least one pattern of sampling, at least one number of samples associated with creating a fingerprint package, or at least one time interval between fingerprint package transmissions may include determining the one or more values based at least in part on a channel associated with the client, a video segment associated with the client, a time offset related to a video segment associated with the client, or a time of day.

In some embodiments, adjusting at least one of the one or more values related to transmitting fingerprints associated with the client to the ACR system may include identifying at least one of a channel or a video segment associated with the client based at least partially on one or more transmitted fingerprint packages; determining whether the at least one of the identified channel or the identified video segment is at least one of a channel of interest or a video segment of interest; and adjusting one or more values related to transmitting fingerprints based at least partially on whether the at least one of the identified channel or the identified video segment is at least one of a channel of interest or a video segment of interest.

In some embodiments, adjusting one or more values related to transmitting fingerprints based at least partially on whether the at least one of the identified channel or the identified video segment is at least one of a channel of interest or a video segment of interest may include determining whether the at least one of the identified channel or the identified video segment is at least one of a channel of interest or a video segment of interest and, if the at least one of the identified channel or the identified video segment is at least one of a channel of interest or a video segment of interest, adjusting one or more values related to transmitting fingerprints wherein the adjusted one or more values are operable to transmit fingerprint packages enabling ACR detection sufficiently fast for providing at least some context-sensitive content substantially simultaneously with at least one targeted video. In some embodiments, adjusting one or more values related to transmitting fingerprints based at least partially on whether the at least one of the identified channel or the identified video segment is at least one of a channel of interest or a video segment of interest may include determining whether the at least one of the identified channel or the identified video segment is at least one of a channel of interest or a video segment of interest and, if the at least one of the identified channel or the identified video segment is at least one of a channel of interest or a video segment of interest, adjusting one or more values related to transmitting fingerprints wherein the adjusted one or more values are operable to transmit fingerprint packages enabling ACR detection sufficiently fast for providing at least some context-sensitive content substantially simultaneously with at least one targeted video.

In some embodiments, adjusting one or more values related to transmitting fingerprints based at least partially on whether the at least one of the identified channel or the identified video segment is at least one of a channel of interest or a video segment of interest may include determining whether the at least one of the identified channel or the identified video segment is at least one of a channel of interest or a video segment of interest and, if the at least one of the identified channel or the identified video segment is not at least one of a channel of interest or a video segment of interest, adjusting one or more values related to transmitting fingerprints wherein the adjusted one or more values are operable to transmit fingerprint packages enabling ACR detection sufficiently fast for detecting a channel to which the client is changed within at least one time proximity of the change of channel.

In some embodiments, adjusting one or more values related to transmitting fingerprints based at least partially on whether the at least one of the identified channel or the identified video segment is at least one of a channel of interest or a video segment of interest may include determining whether the at least one of the identified channel or the identified video segment is at least one of a channel of interest or a video segment of interest and, if the at least one of the identified channel or the identified video segment is not at least one of a channel of interest or a video segment of interest, adjusting one or more values related to transmitting fingerprints wherein the adjusted one or more values are operable to at least one of halt or slow transmission of fingerprint packages until a channel change occurs.

In some embodiments, adjusting one or more values related to transmitting fingerprints based at least partially on whether the at least one of the identified channel or the identified video segment is at least one of a channel of interest or a video segment of interest may include determining whether the at least one of the identified channel or the identified video segment is at least one of a channel of interest or a video segment of interest and, if the at least one of the identified channel or the identified video segment is not at least one of a channel of interest or a video segment of interest, adjusting one or more values related to transmitting fingerprints wherein the adjusted one or more values are operable to at least one of halt or slow transmission of fingerprint packages until a trigger time for an expected video segment of interest occurs.

In some embodiments, adjusting one or more values related to transmitting fingerprints based at least partially on whether the at least one of the identified channel or the identified video segment is at least one of a channel of interest or a video segment of interest may include determining whether the at least one of the identified channel or the identified video segment is at least one of a channel of interest or a video segment of interest and, if the at least one of the identified channel or the identified video segment is not at least one of a channel of interest or a video segment of interest, adjusting one or more values related to transmitting fingerprints wherein the adjusted one or more values are operable to at least one of halt or slow transmission of fingerprint packages until a detection of an ad pod occurs.

In some embodiments, adjusting one or more values related to transmitting fingerprints based at least partially on whether the at least one of the identified channel or the identified video segment is at least one of a channel of interest or a video segment of interest may include determining whether the at least one of the identified channel or the identified video segment is at least one of a channel of interest or a video segment of interest and, if the at least one of the identified channel or the identified video segment is not at least one of a channel of interest or a video segment of interest, adjusting one or more values related to transmitting fingerprints wherein the adjusted one or more values are operable to at least one of halt or slow transmission of fingerprint packages until a detection of a video segment of interest is detected by an ingest system associated with the ACR system.

In some embodiments, adjusting at least one of the one or more values related to transmitting fingerprints associated with the client to the ACR system may include making a first identification of at least one of a channel or a video segment associated with the client based at least partially on at least one transmitted fingerprint package; adjusting at least one of the one or more values related to transmitting fingerprints based at least partially on the first identification; receiving at least one additional transmitted fingerprint package at the ACR system in accordance with the adjusted one or more values related to transmitting fingerprints; making a second identification of at least one of a channel or a video segment associated with the client based at least partially on the at least one transmitted fingerprint package and the at least one additional transmitted fingerprint package; and if the second identification is not the same as the first identification, further adjusting at least one of the one or more values related to transmitting fingerprints. In some embodiments, adjusting at least one of the one or more values related to transmitting fingerprints associated with the client to the ACR system may include at least one of reducing a rate at which fingerprint packages are transmitted, increasing an interval between successive fingerprint packages being transmitted, or reducing a number of fingerprints packaged in a fingerprint package.

In some embodiments, adjusting at least one of the one or more values related to transmitting fingerprints associated with the client to the ACR system may include adjusting one or more values related to transmitting fingerprints associated with a client to the ACR system based at least partially on a recognition of one or more monochromic frames associated with the client, the one or more values operable to cause transmission of fingerprints related to the one or more monochromic frames to be skipped. In some embodiments, adjusting at least one of the one or more values related to transmitting fingerprints associated with the client to the ACR system may include determining one or more values related to transmitting fingerprints associated with a client to the ACR system based at least partially on a recognition of a sequence of fade-to-black frames associated with the client, the one or more values operable to cause transmission of fingerprints related to the sequence of fade-to-black frames to be skipped.

In some embodiments, an exemplary method related to improving server and client performance in fingerprint ACR systems may include receiving a first fingerprint package, the first fingerprint package associated with a first timestamp; retrieving at least one first match based at least partially on the received first fingerprint package, the at least one first match associated with a first video segment; receiving a second fingerprint package, the second fingerprint package associated with a second timestamp; retrieving at least one second match based at least partially on the received second fingerprint package, the at least one second match associated with a second video segment; determining a difference in time between the first timestamp and the second timestamp; and establishing a likelihood that at least one of the first match or the second match correctly identifies a video segment associated with a client sending the first and second fingerprint packages based at least partially on the determined difference in time. In some embodiments, establishing a likelihood that at least one of the first match or the second match correctly identifies a video segment associated with a client sending the first and second fingerprint packages based at least partially on the determined difference in time may include establishing a likelihood that at least one of the first match or the second match correctly identifies a video segment associated with a client sending the first and second fingerprint packages based at least partially on the determined difference in time, wherein increased differences in time correlate with increased likelihoods of correct identifications.

In some embodiments, an exemplary method related to improving server and client performance in fingerprint ACR systems may include receiving a first fingerprint package, the first fingerprint package associated with a first timestamp; retrieving at least one first match based at least partially on the received first fingerprint package, the at least one first match associated with a first video segment and a first offset related to the first video segment; receiving a second fingerprint package, the second fingerprint package associated with a second timestamp; retrieving at least one second match based at least partially on the received second fingerprint package, the at least one second match associated with a second video segment and a second offset related to the second video segment; determining a first duration, the first duration indicative of the first timestamp and the second timestamp; determining whether the first video segment and the second video segment are the same and, if the first video segment and the second video segment are the same, at least: determining a second duration, the second duration indicative of the difference in time between the first offset and the second offset; comparing the first duration with the second duration; and establishing a likelihood that at least one of the first match or second match correctly identifies a video segment associated with a client sending the first and second fingerprint packages based at least partially on the comparison of the first duration with the second duration.

In some embodiments, establishing a likelihood that at least one of the first match or second match correctly identifies a video segment associated with a client sending the first and second fingerprint packages based at least partially on the comparison of the first duration with the second duration may include establishing a likelihood that at least one of the first match or second match correctly identifies a video segment associated with a client sending the first and second fingerprint packages based at least partially on the comparison of the first duration with the second duration, wherein smaller differences in the first duration and the second duration correlates with increased likelihoods of correct identification.

In some embodiments, an exemplary computer program product related to improving server and client performance in fingerprint ACR systems may include at least one non-transitory computer-readable medium, and the at least one non-transitory computer-readable medium may include one or more instructions for determining one or more values related to transmitting fingerprints associated with a client to an Automated Content Recognition (ACR) system, the one or more values associated with one or more of at least one sampling rate, at least one pattern of sampling, at least one number of samples associated with creating a fingerprint package, or at least one time interval between fingerprint package transmissions; one or more instructions for signaling to transmit one or more fingerprint packages associated with a client to an ACR system based at least partially on one or more values related to transmitting fingerprints; and one or more instructions for adjusting at least one of one or more values related to transmitting fingerprints associated with the client to the ACR system.

In some embodiments, an exemplary system related to improving server and client performance in fingerprint ACR systems may include circuitry configured for determining one or more values related to transmitting fingerprints associated with a client to an Automated Content Recognition (ACR) system, the one or more values associated with one or more of at least one sampling rate, at least one pattern of sampling, at least one number of samples associated with creating a fingerprint package, or at least one time interval between fingerprint package transmissions; circuitry configured for signaling to transmit one or more fingerprint packages associated with the client to the ACR system based at least partially on one or more values related to transmitting fingerprints; and circuitry configured for adjusting at least one of one or more values related to transmitting fingerprints associated with the client to the ACR system.

In addition to the foregoing, various other methods, systems and/or program product embodiments are set forth and described in the teachings such as the text (e.g., claims, drawings and/or the detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, embodiments, features and advantages of the device and/or processes and/or other subject matter described herein will become apparent in the teachings set forth herein.

BRIEF DESCRIPTION OF THE DRAWINGS

Certain embodiments of the present invention are described in detail below with reference to the following drawings:

FIG. 4 illustrates an alternative embodiment of the operational flow of FIG. 3.

FIG. 5 illustrates an alternative embodiment of the operational flow of FIG. 3.

FIG. 7 illustrates an alternative embodiment of the operational flow of FIG. 3.

FIG. 8 illustrates an operational flow representing example operations related to improving server and client performance in fingerprint ACR systems.

FIG. 9 illustrates an operational flow representing example operations related to improving server and client performance in fingerprint ACR systems.

FIG. 10 illustrates an exemplary computer program product related to improving server and client performance in fingerprint ACR systems.

FIG. 11 illustrates a system related to improving server and client performance in fingerprint ACR systems.

DETAILED DESCRIPTION

One of the most important metrics of an ACR system from a business perspective is how much said system costs to operate in order to support each specific TV processing means associated with it over some specific unit of time, such as a year. ACR systems must monitor a TV viewing device for many hours while it is on and active, however the system only generates revenue for the operator during the time period which that same TV is locally tuned to a show or a commercial during which the system operator has been contracted to serve the specific contextually-targeted content that is being mediated by the ACR system and other subsystems of the invention.

For example, the operator of the system of the invention could have a contract with some hypothetical customer; for example, "Acme Broadcasting," to provide ACR-mediated contextual content services for some number of its cable channels. In this example, it is assumed there are three such Acme Broadcasting channels. However, to fulfil the contract, the system of the invention would need to monitor every active smart TV viewing means on the cable system or other distribution network, and to monitor them all the time just to catch those instances when any TV on the distribution network happens to be tuned (even momentarily) to one of Acme Broadcasting's channels.

Figure 1:
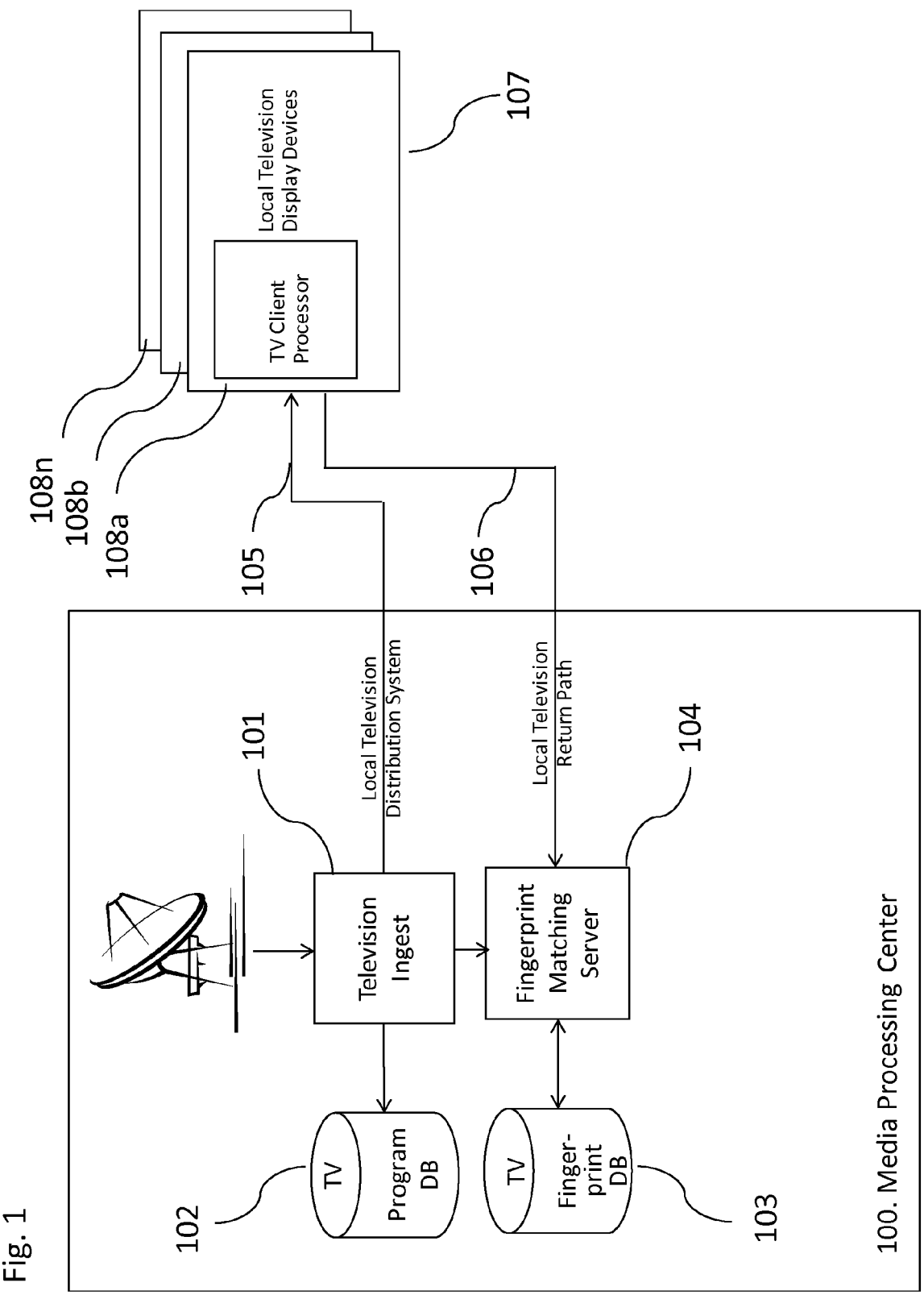
FIG. 1 is a simplified block diagram of one illustrative embodiment of the system and method of this invention. At a regional media processing center 100 television programming is ingested 101 from various sources. Fingerprints are made and stored in a database 103. Programming is distributed 105 to a plurality of individual television viewing devices 107. The client processing means associated with each said device 108a, 108b . . . 108n takes samples of the programming actually being displayed on that TV at any point in time and sends the fingerprints of those samples 106 to the centralized fingerprint matching server 104 to compare against already existing fingerprints in the database 103.

Since those three specific channels of this example represent only a small segment of all TV programming being viewed at any given time on the distribution network that the system of the invention is monitoring as illustrated in FIG. 1 (for this example, assume 10% of all devices) it would clearly be commercially preferable to be able to ration the detection services on the 90% of the distribution system's television viewing means that are not watching those specific three channels at any instant in time.

Figure 2:
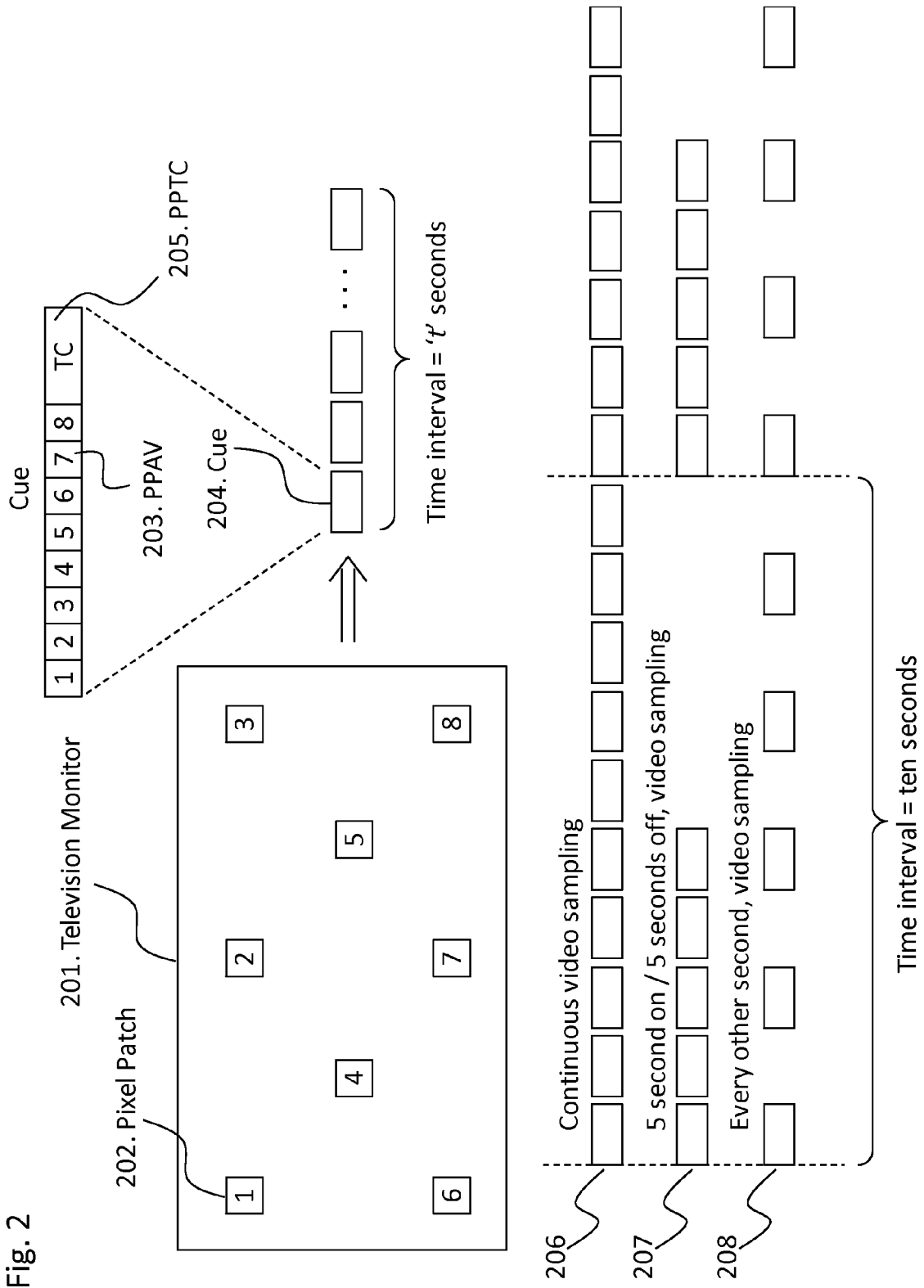
FIG. 2 is a visual depiction of the system and method of this invention. Samples 202 of the TV raster 201 are taken at a variable rate and periodicity 205. The average value 203 for each pixel patch and the total 205 comprise a clue 204 which is created with each sample taken. The frequency and pattern of the sampling may be varied 206, 207, 208, according to an algorithm of the invention to reduce computing demands on the ACR database while still supporting the required functionality.

FIG. 2 illustrates how the algorithm implemented by the system will provide said rationing. From the original patent application, all TV viewing means equipped with appropriate ACR software installed on their internal or associated computing means, use that software to sample the screen at a given rate and then process and package the pixel cues (fingerprints) and send them to the server of the invention at yet another given rate. For the purpose of this example, we assume that the TV's ACR software is sampling the screen at ten times per second and sending the central server means of the invention a package of ten such fingerprints each second.

The server matches the content being viewed on the TV with what is in its database and determines if the TV is tuned to one of the channels of interest. If the result is "no" then the server instructs the application software running in the TV to enter "skip mode" and drop a given number of fingerprints from the number normally sent. For example, the TV application of the invention running on the processing means of each TV set active on the system could be commanded to skip every other data block that would have been sent as shown in 208. That is, instead of every second it would only send fingerprints every other second. Alternatively, the TV set application could be commanded to send fingerprints for five seconds and then skip the next five seconds as shown in 207.

While skipping video frames, the server is still able to detect the content being displayed on the television viewing means, but at a lower resolution and therefore potentially with less accuracy.

If the server determines that the TV is indeed displaying a channel of interest, even if at a low level of confidence, it instructs the TV application of the invention to resume sending every second. If, after more fingerprints (cue values) arrive and with this additional data the server system of the invention determines that it was mistaken and in fact the programming being watched is actually not what it expects to see on one of the channels of interest, it will again instruct the TV based application of the invention to resume skipping data transmissions.

This mechanism can also be applied to individual TV shows as well as channels. In this way, cost of operations is reduced by, in effect, rationing the services. For example, assume that at full detection (i.e. every TV sending cue packages every second) it costs the system operator $1.00 per monitored TV viewing device per year to operate the ACR detection system. Further, assume that the three Acme Broadcasting channels, in the previous example, account for 10% of TV viewing. Then, by using a skipping setting of 2:5 (two seconds on followed by five seconds off) the hypothetical operating cost of the service is reduced to: $2/7 \times \$1 \times 90\% + \$1 \times 10\% = \$0.36$ per TV per year compared to $1.00 per TV per year with the full-resolution scaling of the automated data transmission of this invention.

The system and method of the invention also enables setting timers that cause resolution modes to go up as local clock time at the TV viewing device approaches network or other times when contextually targeted events of the invention are queued in the system. In one embodiment, the new invention will stay in skip frame (low resolution) mode on a channel when an event is not in the context queue. However, when there is an event in said queue expected to occur during a specific show coming up on a given network, the system and method of the invention automatically increases resolution when the show starts.

For example, if the system has detected that a certain TV viewing device utilizing the subject ACR application is tuned to a show on a particular channel, and the system of the invention knows that there is a contextually-targeted event configured to occur during the next hour, then the sampling speed and other resolution metrics may be adjusted in advance.

The same concept should apply for dynamic ad insertion. The system of the invention does not need to operate at the 30 millisecond granularity for the duration of an entire television program of interest but rather this fine granularity of detection is only needed for a couple of seconds prior to a planned insertion point or primary feed restart point.

For lower resolution, the ACR application running in the TV processing means, sends fewer clue points to the server by skipping over frames. If the system is made aware that there is content of interest arriving shortly, the system automatically increases resolution by appropriately modifying sampling rates or other metrics.

On each channel change, the system and method of the invention detects the network and the show in progress. If there are no events during that show that the application of the invention residing in the computing means associated with the specific TV viewing means needs to detect and synchronize to, it will then go into a form of sleep mode until a trigger time for an expected event approaches, or a channel change occurs. An exception to the previous rule might involve directing the application to "wake up" upon the expected arrival of a "pod" of advertising since said ad pod's channel and time slot are known to the system.

Another significant problem with Automatic Content Recognition (ACR) systems, whether audio or video, that can cause loss of efficiency are error rates due to false positives or false negatives where one or more audio or video samples of digital media from an unknown source do not match a reference database of known media when they should, or seem to match samples in the database when they do not. This problem of false negatives or false positives is addressed by the system and method of this invention in several ways including examining if the time stamps on the real time samples and stored references in the database are logically compatible, and if the samples whether new or stored contain enough information to make them unique and usable for identification. For example, samples taken during a "fade to black" sequence would have so little information that they could match no matter what the actual programs were.

A "Confidence Interval" is a metric determined by calculating the difference between the timestamp of the first match the system makes for a given piece of content, and the timestamp of the current match. By way of example, suppose the system matches fingerprints sent to it by the ACR application running on the processing means of the TV viewing device to a certain "TV program A" at a position of 100 seconds subsequent to the start time of said program.

After a period of time, the next fingerprint arrives which matches "TV program A" at a position of 105 seconds from the start of the program. The "confidence interval" is then calculated as the difference between the first and second match positions which in this example is five seconds.

Confidence intervals provide a metric correlated with the relative reliability of the match. High confidence intervals indicated that the matches found are less likely to be false positives. Experimentally, it has been found that confidence intervals that are between one and five seconds in duration are good candidates for an accurate match. In contrast, false positives generally have confidence intervals of less than one second.

The next useful metric is the Ratio of Real-Time to Program-Time. If 100 seconds passes in real time between two matches, and it is known from the matching database that that the two samples match points in the program that differ by 100 seconds when compared to the start of the program, then the match is likely to be correct.

By way of example the system of the invention matches a sample set of pixels of "TV program A" at a position of 100 seconds from the start of said program. Assume that the local time of said match event was 2:20:10 PM EST. Some time passes and the next sample set of pixels arrive for testing. Said sample set matches "TV program A" at a position of 105 seconds from the known start of the show and the current local time of said match event is 2:20:12 PM EST. The "Real-Time Interval" is then calculated as the difference between 2:20:12 and 2:20:10 which is an interval of 2 seconds.

The "Real-Time to Program-Time Ratio" is helpful in maintaining an upper bound on the "Confidence Interval" described earlier. A "Confidence Interval" that is higher than the "Real-Time Interval" is flagged as probably an unreliable match. This is because if actual elapsed time between database "hits" is shorter than the corresponding running time of the TV program under test, then is either the TV device is being "fast-forwarded" through the program, or the system has generated a false positive match.

Another source of computing and other system efficiency is achieved by detecting video fingerprints sampled from monochromic segments or during a fade-to-black sequence. Since such fingerprints contain little or no color information they are not likely to be unique to the programming being monitored and not helpful in identifying it. By eliminating these from the fingerprints transmitted to the centralized matching server means of the system, computing and other system resources are conserved.

This process works as follows. Normally, pixel samples are configured and transmitted by the application running in the processing means of the TV device as three numbers representing the Red, Green, and Blue components of the RGB value.

Prior to such transmission however, An algorithm in the application running in the processing means of the TV viewing device or its associated set-top box performs the following steps:

Sums the standard deviation of each color component of each RGB pixel of a sample set (i.e. sums the standard deviation of the red values plus the standard deviation of the green values plus the standard deviation of the blue values).

Sums the mean value of each color component of each RGB value of said sample pixel set.

If the sum of the standard deviation is below a given threshold and the sum of the mean is below another given threshold then the sample is flagged to be likely to yield a false positive if said sample were to be tested against the reference database.

The above process tests for color uniformity as well as luminance value (brightness). Either condition of color uniformity (for example, a blue screen) or a very dark screen will likely indicate the elevated probability of a false match between said sample and the reference database of the invention. This likelihood of false matching is due to the preponderance of dark video images generated by any television program, such as when a typical television program video fades to black. Similarly, video frames of uniform color, even partially filled are also common in all television programming and provide little or no useful information in identifying unknown video content.

Another source of false positive results in a video matching system is a segment of video that matches very well to some other segment of video that is completely unrelated or to a still frame image. One might refer to said video segment as a "super-matcher." When encountering such a super-matching segment, the ACR matching system becomes stuck in a loop; detecting said segment over and over again as though that segment of video were itself being broadcast in a loop.

To conserve system resources, the ACR fingerprinting application running in the processor or the TV viewing device utilizes the following algorithm to mitigate this undesirable condition.

Subtract the previously described "Confidence Interval," from the "Real-Time Interval," as described above.

If the absolute value of said subtraction is greater than a given threshold, then all of the samples for the duration of said "Confidence Interval" are flagged as being questionable since if a considerable amount of real-time has passed but the video is not progressing forward sufficiently, then the probability of false positive matches increases significantly.

Figure 3:
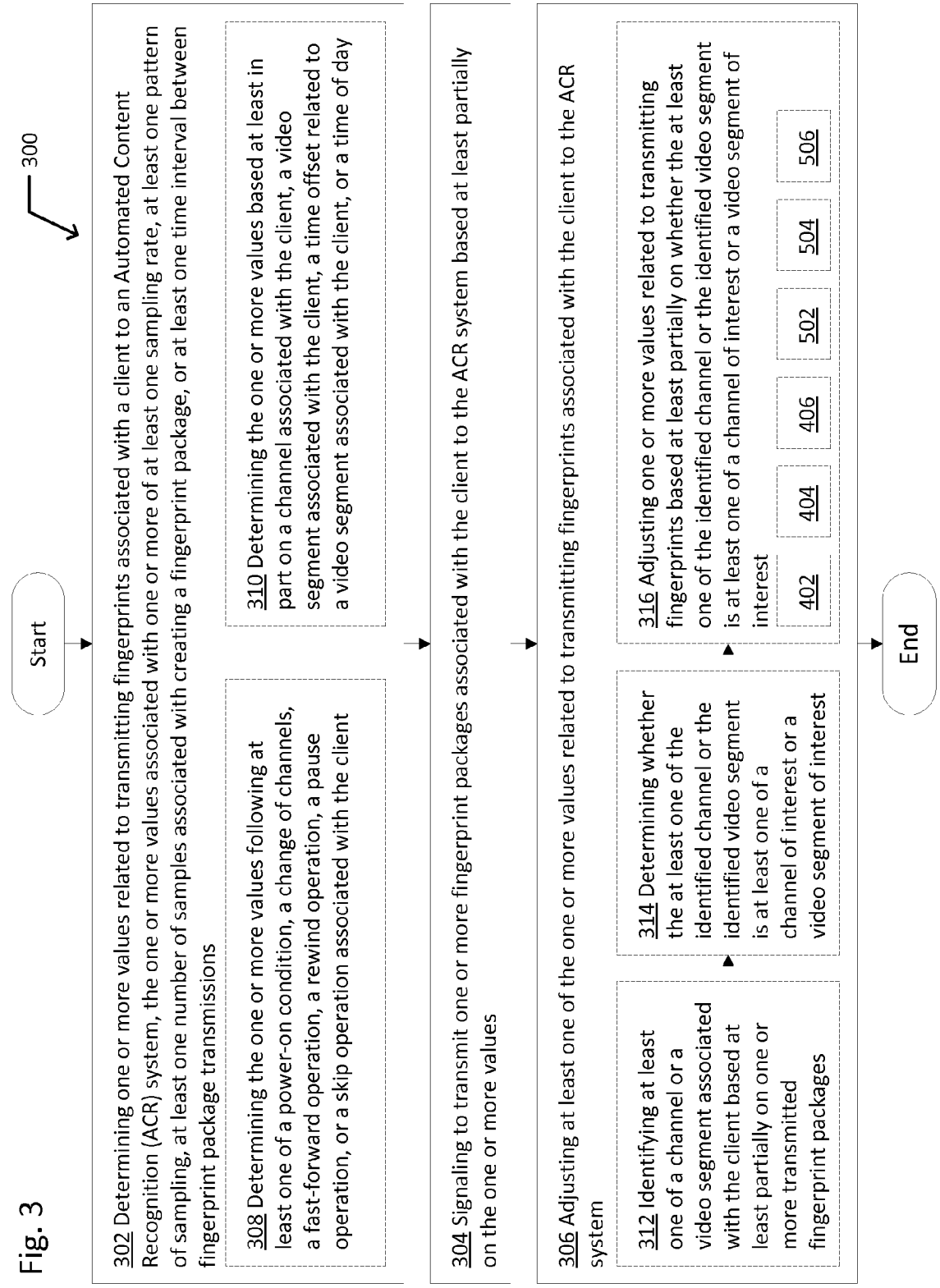
FIG. 3 illustrates an operational flow representing example operations related to improving server and client performance in fingerprint ACR systems.

FIG. 3 illustrates an operational flow 300 representing example operations related to on-screen graphics detection. In FIG. 3 and in following figures that include various examples of operational flows, discussion and explanation may be provided with respect to the above-described examples of FIGS. 1 and 2, and/or with respect to other examples and contexts. However, it should be understood that the operational flows may be executed in a number of other environments and contexts, and/or in modified versions of FIGS. 1 and 2. Also, although the various operational flows are presented in the sequence(s) illustrated, it should be understood that the various operations may be performed in other orders than those which are illustrated, or may be performed concurrently.

After a start operation, the operational flow 300 moves to operation 302. Operation 302 depicts determining one or more values related to transmitting fingerprints associated with a client to an Automated Content Recognition (ACR) system, the one or more values associated with one or more of at least one sampling rate, at least one pattern of sampling, at least one number of samples associated with creating a fingerprint package, or at least one time interval between fingerprint package transmissions. For example, as shown in and/or described with respect to FIGS. 1 and 2.

Then, operation 1304 depicts signaling to transmit one or more fingerprint packages associated with the client to the ACR system based at least partially on the one or more values. For example, as shown in and/or described with respect to FIGS. 1 and 2.

Then, operation 1306 depicts adjusting at least one of the one or more values related to transmitting fingerprints associated with the client to the ACR system. For example, as shown in and/or described with respect to FIGS. 1 and 2.

FIG. 3 also illustrates alternative embodiments of the example operational flow 300. FIG. 3 illustrates an example embodiment where operation 302 may include at least one additional operation. Additional operations may include operation 308 and/or operation 310. FIG. 3 also illustrates an example embodiment where operation 306 may include at least one additional operation. Additional operations may include operation 312, operation 314, and/or operation 316.

Operation 308 illustrates determining the one or more values following at least one of a power-on condition, a change of channels, a fast-forward operation, a rewind operation, a pause operation, or a skip operation associated with the client. For example, as shown in and/or described with respect to FIGS. 1 and 2.

Operation 310 illustrates determining the one or more values based at least in part on a channel associated with the client, a video segment associated with the client, a time offset related to a video segment associated with the client, or a time of day. For example, as shown in and/or described with respect to FIGS. 1 and 2.

Operation 312 illustrates identifying at least one of a channel or a video segment associated with the client based at least partially on one or more transmitted fingerprint packages. For example, as shown in and/or described with respect to FIGS. 1 and 2.

Operation 314 illustrates determining whether the at least one of the identified channel or the identified video segment is at least one of a channel of interest or a video segment of interest. For example, as shown in and/or described with respect to FIGS. 1 and 2.

Operation 316 illustrates adjusting one or more values related to transmitting fingerprints based at least partially on whether the at least one of the identified channel or the identified video segment is at least one of a channel of interest or a video segment of interest. For example, as shown in and/or described with respect to FIGS. 1 and 2.

FIG. 4 illustrates alternative embodiments of the example operational flow 300 of FIG. 3. FIG. 4 illustrates an example embodiment where operation 316 may include at least one additional operation. Additional operations may include operation 402, operation 404, and/or operation 406.

Operation 402 illustrates determining whether the at least one of the identified channel or the identified video segment is at least one of a channel of interest or a video segment of interest and, if the at least one of the identified channel or the identified video segment is at least one of a channel of interest or a video segment of interest, adjusting one or more values related to transmitting fingerprints wherein the adjusted one or more values are operable to transmit fingerprint packages enabling ACR detection sufficiently fast for providing at least some context-sensitive content substantially simultaneously with at least one targeted video. For example, as shown in and/or described with respect to FIGS. 1 and 2.

Further, operation 404 illustrates determining whether the at least one of the identified channel or the identified video segment is at least one of a channel of interest or a video segment of interest and, if the at least one of the identified channel or the identified video segment is not at least one of a channel of interest or a video segment of interest, adjusting one or more values related to transmitting fingerprints wherein the adjusted one or more values are operable to transmit fingerprint packages enabling ACR detection sufficiently fast for detecting a channel to which the client is changed within at least one time proximity of the change of channel. For example, as shown in and/or described with respect to FIGS. 1 and 2.

Further, operation 406 illustrates determining whether the at least one of the identified channel or the identified video segment is at least one of a channel of interest or a video segment of interest and, if the at least one of the identified channel or the identified video segment is not at least one of a channel of interest or a video segment of interest, adjusting one or more values related to transmitting fingerprints wherein the adjusted one or more values are operable to at least one of halt or slow transmission of fingerprint packages until a channel change occurs. For example, as shown in and/or described with respect to FIGS. 1 and 2.

FIG. 5 illustrates alternative embodiments of the example operational flow 300 of FIG. 3. FIG. 5 illustrates an example embodiment where operation 316 may include at least one additional operation. Additional operations may include operation 502, operation 504, and/or operation 506.

Operation 502 illustrates determining whether the at least one of the identified channel or the identified video segment is at least one of a channel of interest or a video segment of interest and, if the at least one of the identified channel or the identified video segment is not at least one of a channel of interest or a video segment of interest, adjusting one or more values related to transmitting fingerprints wherein the adjusted one or more values are operable to at least one of halt or slow transmission of fingerprint packages until a trigger time for an expected video segment of interest occurs. For example, as shown in and/or described with respect to FIGS. 1 and 2.

Further, operation 504 illustrates determining whether the at least one of the identified channel or the identified video segment is at least one of a channel of interest or a video segment of interest and, if the at least one of the identified channel or the identified video segment is not at least one of a channel of interest or a video segment of interest, adjusting one or more values related to transmitting fingerprints wherein the adjusted one or more values are operable to at least one of halt or slow transmission of fingerprint packages until a detection of an ad pod occurs. For example, as shown in and/or described with respect to FIGS. 1 and 2.

Further, operation 506 illustrates determining whether the at least one of the identified channel or the identified video segment is at least one of a channel of interest or a video segment of interest and, if the at least one of the identified channel or the identified video segment is not at least one of a channel of interest or a video segment of interest, adjusting one or more values related to transmitting fingerprints wherein the adjusted one or more values are operable to at least one of halt or slow transmission of fingerprint packages until a detection of a video segment of interest is detected by an ingest system associated with the ACR system. For example, as shown in and/or described with respect to FIGS. 1 and 2.

Figure 6:
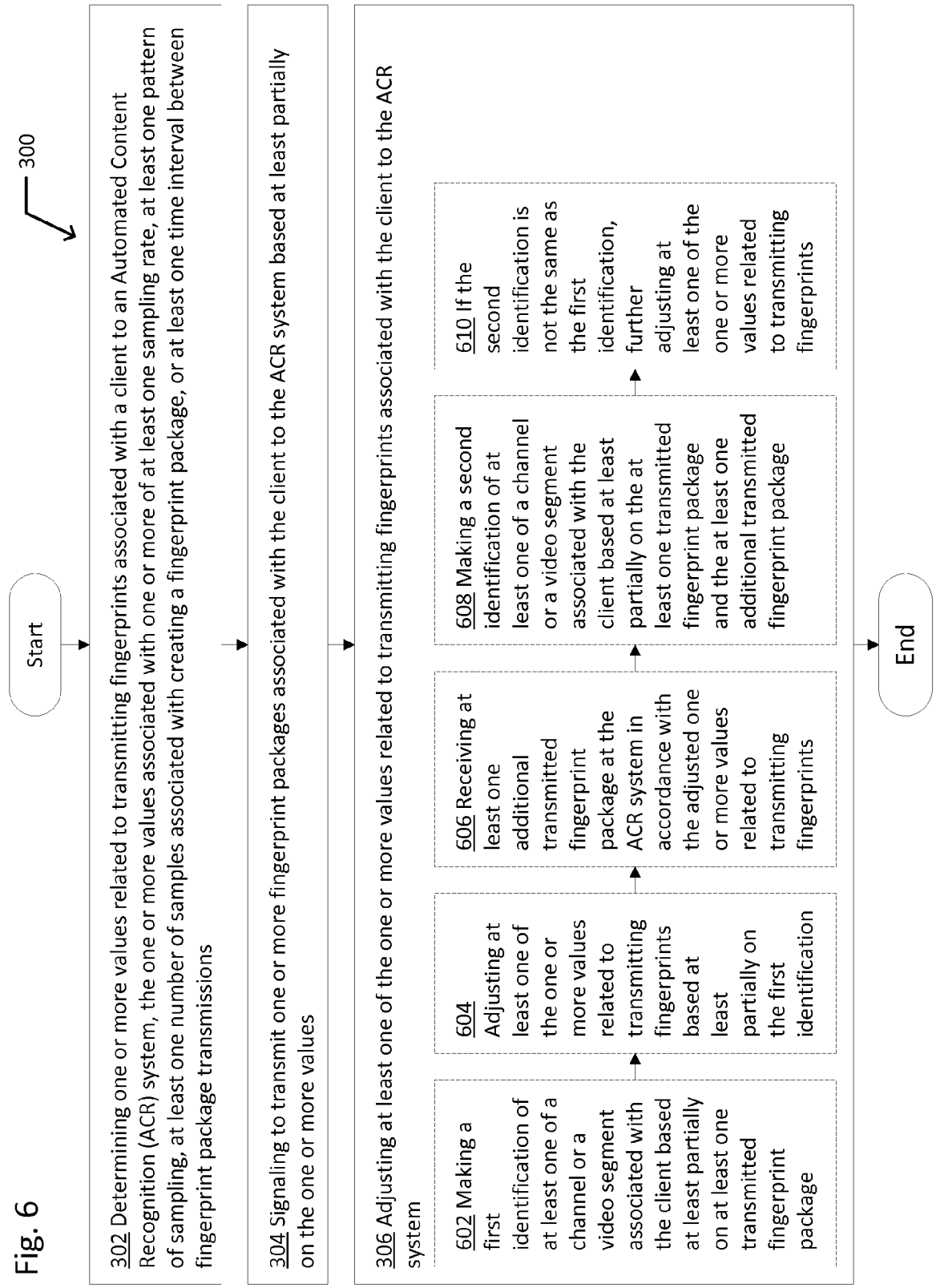
FIG. 6 illustrates an alternative embodiment of the operational flow of FIG. 3.

FIG. 6 illustrates alternative embodiments of the example operational flow 300 of FIG. 3. FIG. 6 illustrates an example embodiment where operation 306 may include at least one additional operation. Additional operations may include operation 602, operation 604, operation 606, operation 608, and/or operation 610.

Operation 602 illustrates making a first identification of at least one of a channel or a video segment associated with the client based at least partially on at least one transmitted fingerprint package. For example, as shown in and/or described with respect to FIGS. 1 and 2.

Further, operation 604 illustrates adjusting at least one of the one or more values related to transmitting fingerprints based at least partially on the first identification. For example, as shown in and/or described with respect to FIGS. 1 and 2.

Further, operation 606 illustrates receiving at least one additional transmitted fingerprint package at the ACR system in accordance with the adjusted one or more values related to transmitting fingerprints. For example, as shown in and/or described with respect to FIGS. 1 and 2.

Further, operation 608 illustrates making a second identification of at least one of a channel or a video segment associated with the client based at least partially on the at least one transmitted fingerprint package and the at least one additional transmitted fingerprint package. For example, as shown in and/or described with respect to FIGS. 1 and 2.

Further, operation 610 illustrates if the second identification is not the same as the first identification, further adjusting at least one of the one or more values related to transmitting fingerprints. For example, as shown in and/or described with respect to FIGS. 1 and 2.

FIG. 7 illustrates alternative embodiments of the example operational flow 300 of FIG. 3. FIG. 7 illustrates an example embodiment where operation 307 may include at least one additional operation. Additional operations may include operation 702, operation 704, and/or operation 706.

Operation 702 illustrates at least one of reducing a rate at which fingerprint packages are transmitted, increasing an interval between successive fingerprint packages being transmitted, or reducing a number of fingerprints packaged in a fingerprint package. For example, as shown in and/or described with respect to FIGS. 1 and 2.

Further, operation 704 illustrates adjusting one or more values related to transmitting fingerprints associated with a client to the ACR system based at least partially on a recognition of one or more monochromic frames associated with the client, the one or more values operable to cause transmission of fingerprints related to the one or more monochromic frames to be skipped. For example, as shown in and/or described with respect to FIGS. 1 and 2.

Further, operation 706 illustrates determining one or more values related to transmitting fingerprints associated with a client to the ACR system based at least partially on a recognition of a sequence of fade-to-black frames associated with the client, the one or more values operable to cause transmission of fingerprints related to the sequence of fade-to-black frames to be skipped. For example, as shown in and/or described with respect to FIGS. 1 and 2.

FIG. 8 illustrates an operational flow 800 representing example operations related to on-screen graphics detection. In FIG. 8 and in following figures that include various examples of operational flows, discussion and explanation may be provided with respect to the above-described examples of FIGS. 1 and 2, and/or with respect to other examples and contexts. However, it should be understood that the operational flows may be executed in a number of other environments and contexts, and/or in modified versions of FIGS. 1 and 2. Also, although the various operational flows are presented in the sequence(s) illustrated, it should be understood that the various operations may be performed in other orders than those which are illustrated, or may be performed concurrently.

After a start operation, the operational flow 800 moves to operation 802. Operation 802 depicts receiving a first fingerprint package, the first fingerprint package associated with a first timestamp. For example, as shown in and/or described with respect to FIGS. 1 and 2.

Then, operation 804 depicts retrieving at least one first match based at least partially on the received first fingerprint package, the at least one first match associated with a first video segment. For example, as shown in and/or described with respect to FIGS. 1 and 2.

Then, operation 806 depicts receiving a second fingerprint package, the second fingerprint package associated with a second timestamp. For example, as shown in and/or described with respect to FIGS. 1 and 2.

Then, operation 808 depicts retrieving at least one second match based at least partially on the received second fingerprint package, the at least one second match associated with a second video segment. For example, as shown in and/or described with respect to FIGS. 1 and 2.

Then, operation 810 depicts determining a difference in time between the first timestamp and the second timestamp. For example, as shown in and/or described with respect to FIGS. 1 and 2.

Then, operation 812 depicts establishing a likelihood that at least one of the first match or the second match correctly identifies a video segment associated with a client sending the first and second fingerprint packages based at least partially on the determined difference in time. For example, as shown in and/or described with respect to FIGS. 1 and 2.

FIG. 8 also illustrates alternative embodiments of the example operational flow 800. FIG. 8 illustrates an example embodiment where operation 812 may include at least one additional operation 814.

Operation 814 illustrates establishing a likelihood that at least one of the first match or the second match correctly identifies a video segment associated with a client sending the first and second fingerprint packages based at least partially on the determined difference in time, wherein increased differences in time correlate with increased likelihoods of correct identifications. For example, as shown in and/or described with respect to FIGS. 1 and 2.

FIG. 9 illustrates an operational flow 900 representing example operations related to on-screen graphics detection. In FIG. 9 and in following figures that include various examples of operational flows, discussion and explanation may be provided with respect to the above-described examples of FIGS. 1 and 2, and/or with respect to other examples and contexts. However, it should be understood that the operational flows may be executed in a number of other environments and contexts, and/or in modified versions of FIGS. 1 and 2. Also, although the various operational flows are presented in the sequence(s) illustrated, it should be understood that the various operations may be performed in other orders than those which are illustrated, or may be performed concurrently.

After a start operation, the operational flow 900 moves to operation 902. Operation 902 depicts receiving a first fingerprint package, the first fingerprint package associated with a first timestamp. For example, as shown in and/or described with respect to FIGS. 1 and 2.

Then, operation 904 depicts retrieving at least one first match based at least partially on the received first fingerprint package, the at least one first match associated with a first video segment and a first offset related to the first video segment. For example, as shown in and/or described with respect to FIGS. 1 and 2.

Then, operation 906 depicts receiving a second fingerprint package, the second fingerprint package associated with a second timestamp. For example, as shown in and/or described with respect to FIGS. 1 and 2.

Then, operation 908 depicts retrieving at least one second match based at least partially on the received second fingerprint package, the at least one second match associated with a second video segment and a second offset related to the second video segment. For example, as shown in and/or described with respect to FIGS. 1 and 2.

Then, operation 910 depicts determining a first duration, the first duration indicative of the first timestamp and the second timestamp. For example, as shown in and/or described with respect to FIGS. 1 and 2.

Then, operation 912 depicts determining whether the first video segment and the second video segment are the same and, if the first video segment and the second video segment are the same, at least: determining a second duration, the second duration indicative of the difference in time between the first offset and the second offset; comparing the first duration with the second duration; and establishing a likelihood that at least one of the first match or second match correctly identifies a video segment associated with a client sending the first and second fingerprint packages based at least partially on the comparison of the first duration with the second duration. For example, as shown in and/or described with respect to FIGS. 1 and 2.

FIG. 9 also illustrates alternative embodiments of the example operational flow 900. FIG. 9 illustrates an example embodiment where operation 912 may include at least one additional operation 914.

Operation 914 illustrates establishing a likelihood that at least one of the first match or second match correctly identifies a video segment associated with a client sending the first and second fingerprint packages based at least partially on the comparison of the first duration with the second duration, wherein smaller differences in the first duration and the second duration correlates with increased likelihoods of correct identification. For example, as shown in and/or described with respect to FIGS. 1 and 2.

FIG. 10 illustrates an exemplary computer program product 1000 which may include at least one non-transitory computer-readable medium. Further illustrated in FIG. 10 are instructions 1002 of computer program product 1000. Instructions 1002 illustrate one or more instructions for determining one or more values related to transmitting fingerprints associated with a client to an Automated Content Recognition (ACR) system, the one or more values associated with one or more of at least one sampling rate, at least one pattern of sampling, at least one number of samples associated with creating a fingerprint package, or at least one time interval between fingerprint package transmissions; one or more instructions for signaling to transmit one or more fingerprint packages associated with a client to an ACR system based at least partially on one or more values related to transmitting fingerprints; and one or more instructions for adjusting at least one of one or more values related to transmitting fingerprints associated with the client to the ACR system. For example, as shown in and/or described with respect to FIGS. 1 through 9, a computer program product may include one or more instructions encoded on and/or stored by one or more non-transitory computer-readable media. The one or more instructions may, when executed by one or more processing devices, cause the one or more processing devices to perform operations including detecting one or more graphics superimposed over a content rendered on a display of a television; and providing at least some data associated with the detected one or more graphics to at least one content recognition operation configured for at least determining one or more identifiers associated with the content being rendered. The foregoing operations may be similar at least in part and/or be substantially similar to (but are not limited to) corresponding operations disclosed elsewhere herein.

FIG. 11 illustrates an exemplary system 1100. System 1100 may include circuitry 1102, circuitry 1104, and/or circuitry 1106.

Circuitry 1102 illustrates circuitry configured for determining one or more values related to transmitting fingerprints associated with a client to an Automated Content Recognition (ACR) system, the one or more values associated with one or more of at least one sampling rate, at least one pattern of sampling, at least one number of samples associated with creating a fingerprint package, or at least one time interval between fingerprint package transmissions. For example, as shown in and/or described with respect to FIGS. 1 through 9, circuitry 1102 may cause operations with an effect similar at least in part and/or substantially similar to (but not limited to) corresponding operations disclosed elsewhere herein.

Then, circuitry 1104 illustrates circuitry configured for signaling to transmit one or more fingerprint packages associated with the client to the ACR system based at least partially on one or more values related to transmitting fingerprints. For example, as shown in and/or described with respect to FIGS. 1 through 9, circuitry 1104 may cause operations with an effect similar at least in part and/or substantially similar to (but not limited to) corresponding operations disclosed elsewhere herein.

Then, circuitry 1106 illustrates circuitry configured for adjusting at least one of one or more values related to transmitting fingerprints associated with the client to the ACR system. For example, as shown in and/or described with respect to FIGS. 1 through 9, circuitry 1104 may cause operations with an effect similar at least in part and/or substantially similar to (but not limited to) corresponding operations disclosed elsewhere herein.

The system and methods, flow diagrams, and structure block diagrams described in this specification may be implemented in computer processing systems including program code comprising program instructions that are executable by a computer processing system. Other implementations may also be used. Additionally, the flow diagrams and structure block diagrams herein described describe particular methods and/or corresponding acts in support of steps and corresponding functions in support of disclosed structural means, may also be utilized to implement corresponding software structures and algorithms, and equivalents thereof.

Embodiments of the subject matter described in this specification can be implemented as one or more computer program products, i.e., one or more modules of computer program instructions encoded on a tangible program carrier for execution by, or to control the operation of, data processing apparatus. The computer readable medium can be a machine readable storage device, a machine readable storage substrate, a memory device, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a suitable communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Processors suitable for the execution of a computer program include, by way of example only and without limitation, both general and special purpose microprocessors, and any one or more processors of any kind of digital computer. Generally, a processor will receive instructions and data from a read only memory or a random access memory or both.

To provide for interaction with a user or manager of the system described herein, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. For example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes back end component(s) including one or more data servers, or that includes one or more middleware components such as application servers, or that includes a front end component such as a client computer having a graphical user interface or a Web browser through which a user or administrator can interact with some implementations of the subject matter described is this specification, or any combination of one or more such back end, middleware, or front end components. The components of the system can be interconnected by any form or medium of digital data communication, such as a communication network. The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method, comprising:
    determining one or more values related to transmitting fingerprints associated with a client to an Automated Content Recognition (ACR) system, the one or more values associated with one or more of at least one sampling rate, at least one pattern of sampling, at least one number of samples associated with creating a fingerprint package, or at least one time interval between fingerprint package transmissions;
    signaling to transmit one or more fingerprint packages associated with the client to the ACR system based at least partially on the one or more values;
    identifying at least one of a channel or a video segment associated with the client based at least partially on one or more transmitted fingerprint packages; and
    determining whether the at least one of the identified channel or the identified video segment is at least one of a channel of interest or a video segment of interest and, if the at least one of the identified channel or the identified video segment is at least one of a channel of interest or a video segment of interest, adjusting at least one of the one or more values related to transmitting fingerprints wherein the adjusted one or more values are operable to transmit fingerprint packages enabling ACR detection sufficiently fast for providing at least some context-sensitive content substantially simultaneously with at least one targeted video.

2. The method of claim 1, wherein determining one or more values related to transmitting fingerprints associated with a client to an Automated Content Recognition (ACR) system, the one or more values associated with one or more of at least one sampling rate, at least one pattern of sampling, at least one number of samples associated with creating a fingerprint package, or at least one time interval between fingerprint package transmissions comprises:
    determining the one or more values following at least one of a power-on condition, a change of channels, a fast-forward operation, a rewind operation, a pause operation, or a skip operation associated with the client.

3. The method of claim 1, wherein determining one or more values related to transmitting fingerprints associated with a client to an Automated Content Recognition (ACR) system, the one or more values associated with one or more of at least one sampling rate, at least one pattern of sampling, at least one number of samples associated with creating a fingerprint package, or at least one time interval between fingerprint package transmissions comprises:
    determining the one or more values based at least in part on a channel associated with the client, a video segment associated with the client, a time offset related to a video segment associated with the client, or a time of day.

4. The method of claim 1, further comprising:
    determining whether the at least one of the identified channel or the identified video segment is at least one of a channel of interest or a video segment of interest and, if the at least one of the identified channel or the identified video segment is not at least one of a channel of interest or a video segment of interest, adjusting one or more values related to transmitting fingerprints wherein the adjusted one or more values are operable to at least one of (i) transmit fingerprint packages enabling ACR detection sufficiently fast for detecting a channel to which the client is changed within at least one time proximity of the change of channel, (ii) at least one of halt or slow transmission of fingerprint packages until a channel change occurs, (iii) at least one of halt or slow transmission of fingerprint packages until a trigger time for an expected video segment of interest occurs, (iv) at least one of halt or slow transmission of fingerprint packages until a detection of an ad pod occurs, or (v) at least one of halt or slow transmission of fingerprint packages until a detection of a video segment of interest is detected by an ingest system associated with the ACR system.

5. The method of claim 1, further comprising:
receiving at least one additional transmitted fingerprint package at the ACR system in accordance with the adjusted one or more values related to transmitting fingerprints;
making a second identification of at least one of a channel or a video segment associated with the client based at least partially on the one or more transmitted fingerprint packages and the at least one additional transmitted fingerprint package; and
if the second identification is not associated with the at least one of the identified channel or the identified video segment, further adjusting at least one of the one or more values related to transmitting fingerprints.

6. The method of claim 1, wherein determining whether the at least one of the identified channel or the identified video segment is at least one of a channel of interest or a video segment of interest and, if the at least one of the identified channel or the identified video segment is at least one of a channel of interest or a video segment of interest, adjusting at least one of the one or more values related to transmitting fingerprints wherein the adjusted one or more values are operable to transmit fingerprint packages enabling ACR detection sufficiently fast for providing at least some context-sensitive content substantially simultaneously with at least one targeted video comprises:
at least one of (i) altering at least one sampling rate, (ii) altering at least one pattern of sampling, (iii) altering at least one number of samples associated with creating a fingerprint package, (iv) altering a rate at which fingerprint packages are transmitted, (v) altering an interval between successive fingerprint packages being transmitted, or (vi) altering a number of fingerprints packaged in a fingerprint package if the at least one of the identified channel or the identified video segment is at least one of a channel of interest or a video segment of interest.

7. The method of claim 1, further comprising:
signaling to transmit one or more fingerprint packages associated with the client to the ACR system based at least partially on the adjusted one or more values.

8. The method of claim 1, wherein signaling to transmit one or more fingerprint packages associated with the client to the ACR system based at least partially on the one or more values comprises:
providing, at least partially via the Internet, a signal to a smart television to transmit, at least partially via the Internet, one or more fingerprint packages from the smart television to the ACR system based at least partially on the one or more values.

9. The method of claim 1, wherein identifying at least one of a channel or a video segment associated with the client based at least partially on one or more transmitted fingerprint packages comprises:
receiving the one or more fingerprint packages from a smart television, the one or more fingerprint packages transmitted by the smart television at least partially via the Internet;
querying a media database using at least some data from at least one of the received one or more fingerprint packages as a search term;
receiving one or more candidate channels or video segments from the media database as one or more search results; and
identifying the at least one of a channel or a video segment based at least partially on the received one or more candidate channels or video segments.

10. A method, comprising:
receiving a first fingerprint package, the received first fingerprint package associated with a first timestamp, and retrieving at least one first match based at least partially on the received first fingerprint package, the at least one first match associated with a first video channel or video segment;
receiving a second fingerprint package, the received second fingerprint package associated with a second timestamp, and retrieving at least one second match based at least partially on the received second fingerprint package, the at least one second match associated with a second video channel or video segment; and
determining a difference in time between the first timestamp and the second timestamp and establishing a likelihood that at least one of the first match or the second match correctly identifies a video channel or video segment associated with a client sending the first and second fingerprint packages based at least partially on the determined difference in time, wherein differences in time correlate with different likelihoods of correct identifications.

11. The method of claim 10, wherein receiving a first fingerprint package, the received first fingerprint package associated with a first timestamp, and retrieving at least one first match based at least partially on the received first fingerprint package, the at least one first match associated with a first video channel or video segment comprises:
receiving a first fingerprint package sent by a smart television at least partially via the Internet, the received first fingerprint package associated with a first timestamp, and retrieving at least one first match based at least partially on the received first fingerprint package, the at least one first match associated with a first video channel or video segment.

12. The method of claim 10, wherein receiving a second fingerprint package, the received second fingerprint package associated with a second timestamp, and retrieving at least one second match based at least partially on the received second fingerprint package, the at least one second match associated with a second video channel or video segment comprises:
receiving a second fingerprint package, the received second fingerprint package associated with a second timestamp, and retrieving at least one second match from a media database associated with an Automated Content Recognition (ACR) system based at least partially on the received second fingerprint package, the at least one second match associated with a second video channel or video segment.

13. The method of claim 10, wherein determining a difference in time between the first timestamp and the second timestamp and establishing a likelihood that at least one of the first match or the second match correctly identifies a video channel or video segment associated with a client sending the first and second fingerprint packages based at least partially on the determined difference in time, wherein differences in time correlate with different likelihoods of correct identifications comprises:
   determining a confidence interval based at least partially on a difference in time between the first timestamp and the second timestamp; and
   establishing a likelihood that at least one of the first match or the second match correctly identifies a video channel or video segment associated with a client sending the first and second fingerprint packages based at least partially on the determined confidence interval.

14. The system of claim 10, wherein circuitry configured for receiving a first fingerprint package, the received first fingerprint package associated with a first timestamp, and retrieving at least one first match based at least partially on the received first fingerprint package, the at least one first match associated with a first video channel or video segment comprises:
   circuitry configured for receiving a first fingerprint package sent by a smart television at least partially via the Internet, the received first fingerprint package associated with a first timestamp, and retrieving at least one first match based at least partially on the received first fingerprint package, the at least one first match associated with a first video channel or video segment.

15. The system of claim 10, wherein circuitry configured for receiving a second fingerprint package, the received second fingerprint package associated with a second timestamp, and retrieving at least one second match based at least partially on the received second fingerprint package, the at least one second match associated with a second video channel or video segment comprises:
   circuitry configured for receiving a second fingerprint package, the received second fingerprint package associated with a second timestamp, and retrieving at least one second match from a media database associated with an Automated Content Recognition (ACR) system based at least partially on the received second fingerprint package, the at least one second match associated with a second video channel or video segment.

16. The system of claim 10, wherein circuitry configured for determining a difference in time between the first timestamp and the second timestamp and establishing a likelihood that at least one of the first match or the second match correctly identifies a video channel or video segment associated with a client sending the first and second fingerprint packages based at least partially on the determined difference in time, wherein differences in time correlate with different likelihoods of correct identifications comprises:
   circuitry configured for determining a confidence interval based at least partially on a difference in time between the first timestamp and the second timestamp; and
   circuitry configured for establishing a likelihood that at least one of the first match or the second match correctly identifies a video channel or video segment associated with a client sending the first and second fingerprint packages based at least partially on the determined confidence interval.

17. A computer program product, comprising:
   at least one non-transitory computer-readable medium including at least:
      one or more instructions for determining one or more values related to transmitting fingerprints associated with a client to an Automated Content Recognition (ACR) system, the one or more values associated with one or more of at least one sampling rate, at least one pattern of sampling, at least one number of samples associated with creating a fingerprint package, or at least one time interval between fingerprint package transmissions;
      one or more instructions for signaling to transmit one or more fingerprint packages associated with the client to the ACR system based at least partially on the one or more values;
      one or more instructions for identifying at least one of a channel or a video segment associated with the client based at least partially on one or more transmitted fingerprint packages; and
      one or more instructions for determining whether the at least one of the identified channel or the identified video segment is at least one of a channel of interest or a video segment of interest and, if the at least one of the identified channel or the identified video segment is at least one of a channel of interest or a video segment of interest, adjusting at least one of the one or more values related to transmitting fingerprints wherein the adjusted one or more values are operable to transmit fingerprint packages enabling ACR detection sufficiently fast for providing at least some context-sensitive content substantially simultaneously with at least one targeted video.

18. The computer program product of claim 17, wherein at least some of the one or more instructions for determining one or more values related to transmitting fingerprints associated with a client to an Automated Content Recognition (ACR) system, the one or more values associated with one or more of at least one sampling rate, at least one pattern of sampling, at least one number of samples associated with creating a fingerprint package, or at least one time interval between fingerprint package transmissions comprise:
   one or more instructions for determining the one or more values following at least one of a power-on condition, a change of channels, a fast-forward operation, a rewind operation, a pause operation, or a skip operation associated with the client.

19. The computer program product of claim 17, wherein at least some of the one or more instructions for determining one or more values related to transmitting fingerprints associated with a client to an Automated Content Recognition (ACR) system, the one or more values associated with one or more of at least one sampling rate, at least one pattern of sampling, at least one number of samples associated with creating a fingerprint package, or at least one time interval between fingerprint package transmissions comprise:
   one or more instructions for determining the one or more values based at least in part on a channel associated with the client, a video segment associated with the client, a time offset related to a video segment associated with the client, or a time of day.

20. The computer program product of claim 17, wherein at least some of the one or more instructions for signaling to transmit one or more fingerprint packages associated with the client to the ACR system based at least partially on the one or more values comprise:
   one or more instructions for providing, at least partially via the Internet, a signal to a smart television to transmit, at least partially via the Internet, one or more fingerprint packages from the smart television to the ACR system based at least partially on the one or more values.

21. The computer program product of claim 17, wherein at least some of the one or more instructions for identifying at least one of a channel or a video segment associated with the client based at least partially on one or more transmitted fingerprint packages comprise:
- one or more instructions for receiving the one or more fingerprint packages from a smart television, the one or more fingerprint packages transmitted by the smart television at least partially via the Internet;
- one or more instructions for querying a media database using at least some data from at least one of the received one or more fingerprint packages as a search term;
- one or more instructions for receiving one or more candidate channels or video segments from the media database as one or more search results; and
- one or more instructions for identifying the at least one of a channel or a video segment based at least partially on the received one or more candidate channels or video segments.

22. The computer program product of claim 17, wherein at least some of the one or more instructions for determining whether the at least one of the identified channel or the identified video segment is at least one of a channel of interest or a video segment of interest and, if the at least one of the identified channel or the identified video segment is at least one of a channel of interest or a video segment of interest, adjusting at least one of the one or more values related to transmitting fingerprints wherein the adjusted one or more values are operable to transmit fingerprint packages enabling ACR detection sufficiently fast for providing at least some context-sensitive content substantially simultaneously with at least one targeted video comprise:
- one or more instructions for at least one of (i) altering at least one sampling rate, (ii) altering at least one pattern of sampling, (iii) altering at least one number of samples associated with creating a fingerprint package, (iv) altering a rate at which fingerprint packages are transmitted, (v) altering an interval between successive fingerprint packages being transmitted, or (vi) altering a number of fingerprints packaged in a fingerprint package if the at least one of the identified channel or the identified video segment is at least one of a channel of interest or a video segment of interest.

23. The computer program product of claim 17, wherein the at least one non-transitory computer-readable medium further comprises:
- one or more instructions for receiving at least one additional transmitted fingerprint package at the ACR system in accordance with the adjusted one or more values related to transmitting fingerprints;
- one or more instructions for making a second identification of at least one of a channel or a video segment associated with the client based at least partially on the one or more transmitted fingerprint packages and the at least one additional transmitted fingerprint package; and
- one or more instructions for, if the second identification is not associated with the at least one of the identified channel or the identified video segment, further adjusting at least one of the one or more values related to transmitting fingerprints.

24. The computer program product of claim 17, wherein the at least one non-transitory computer-readable medium further comprises:
- one or more instructions for determining whether the at least one of the identified channel or the identified video segment is at least one of a channel of interest or a video segment of interest and, if the at least one of the identified channel or the identified video segment is not at least one of a channel of interest or a video segment of interest, adjusting one or more values related to transmitting fingerprints wherein the adjusted one or more values are operable to at least one of (i) transmit fingerprint packages enabling ACR detection sufficiently fast for detecting a channel to which the client is changed within at least one time proximity of the change of channel, (ii) at least one of halt or slow transmission of fingerprint packages until a channel change occurs, (iii) at least one of halt or slow transmission of fingerprint packages until a trigger time for an expected video segment of interest occurs, (iv) at least one of halt or slow transmission of fingerprint packages until a detection of an ad pod occurs, or (v) at least one of halt or slow transmission of fingerprint packages until a detection of a video segment of interest is detected by an ingest system associated with the ACR system.

25. The computer program product of claim 17, wherein the at least one non-transitory computer-readable medium further comprises:
- one or more instructions for signaling to transmit one or more fingerprint packages associated with the client to the ACR system based at least partially on the adjusted one or more values.

26. A system, comprising:
- circuitry configured for determining one or more values related to transmitting fingerprints associated with a client to an Automated Content Recognition (ACR) system, the one or more values associated with one or more of at least one sampling rate, at least one pattern of sampling, at least one number of samples associated with creating a fingerprint package, or at least one time interval between fingerprint package transmissions;
- circuitry configured for signaling to transmit one or more fingerprint packages associated with the client to the ACR system based at least partially on the one or more values;
- circuitry configured for identifying at least one of a channel or a video segment associated with the client based at least partially on one or more transmitted fingerprint packages; and
- circuitry configured for determining whether the at least one of the identified channel or the identified video segment is at least one of a channel of interest or a video segment of interest and, if the at least one of the identified channel or the identified video segment is at least one of a channel of interest or a video segment of interest, adjusting at least one of the one or more values related to transmitting fingerprints wherein the adjusted one or more values are operable to transmit fingerprint packages enabling ACR detection sufficiently fast for providing at least some context-sensitive content substantially simultaneously with at least one targeted video.

27. The system of claim 26, wherein circuitry for determining one or more values related to transmitting fingerprints associated with a client to an Automated Content Recognition (ACR) system, the one or more values associated with one or more of at least one sampling rate, at least one pattern of sampling, at least one number of samples associated with creating a fingerprint package, or at least one time interval between fingerprint package transmissions comprises:
- one or more instructions for determining the one or more values following at least one of a power-on condition, a change of channels, a fast-forward operation, a rewind operation, a pause operation, or a skip operation associated with the client.

28. The system of claim 26, wherein circuitry for determining one or more values related to transmitting fingerprints associated with a client to an Automated Content Recognition (ACR) system, the one or more values associated with one or more of at least one sampling rate, at least one pattern of sampling, at least one number of samples associated with creating a fingerprint package, or at least one time interval between fingerprint package transmissions comprises:
- circuitry for determining the one or more values based at least in part on a channel associated with the client, a video segment associated with the client, a time offset related to a video segment associated with the client, or a time of day.

29. The system of claim 26, wherein circuitry for signaling to transmit one or more fingerprint packages associated with the client to the ACR system based at least partially on the one or more values comprises:
- circuitry providing, at least partially via the Internet, a signal to a smart television to transmit, at least partially via the Internet, one or more fingerprint packages from the smart television to the ACR system based at least partially on the one or more values.

30. The system of claim 26, wherein circuitry for identifying at least one of a channel or a video segment associated with the client based at least partially on one or more transmitted fingerprint packages comprises:
- circuitry for receiving the one or more fingerprint packages from a smart television, the one or more fingerprint packages transmitted by the smart television at least partially via the Internet;
- circuitry for querying a media database using at least some data from at least one of the received one or more fingerprint packages as a search term;
- circuitry for receiving one or more candidate channels or video segments from the media database as one or more search results; and
- circuitry for identifying the at least one of a channel or a video segment based at least partially on the received one or more candidate channels or video segments.

31. The system of claim 26, wherein circuitry for determining whether the at least one of the identified channel or the identified video segment is at least one of a channel of interest or a video segment of interest and, if the at least one of the identified channel or the identified video segment is at least one of a channel of interest or a video segment of interest, adjusting at least one of the one or more values related to transmitting fingerprints wherein the adjusted one or more values are operable to transmit fingerprint packages enabling ACR detection sufficiently fast for providing at least some context-sensitive content substantially simultaneously with at least one targeted video comprises:
- circuitry for at least one of (i) altering at least one sampling rate, (ii) altering at least one pattern of sampling, (iii) altering at least one number of samples associated with creating a fingerprint package, (iv) altering a rate at which fingerprint packages are transmitted, (v) altering an interval between successive fingerprint packages being transmitted, or (vi) altering a number of fingerprints packaged in a fingerprint package if the at least one of the identified channel or the identified video segment is at least one of a channel of interest or a video segment of interest.

32. The system of claim 26, further comprising:
- circuitry for receiving at least one additional transmitted fingerprint package at the ACR system in accordance with the adjusted one or more values related to transmitting fingerprints;
- circuitry for making a second identification of at least one of a channel or a video segment associated with the client based at least partially on the one or more transmitted fingerprint packages and the at least one additional transmitted fingerprint package; and
- for, if the second identification is not associated with the at least one of the identified channel or the identified video segment, further adjusting at least one of the one or more values related to transmitting fingerprints.

33. The system of claim 26, further comprising:
- circuitry for determining whether the at least one of the identified channel or the identified video segment is at least one of a channel of interest or a video segment of interest and, if the at least one of the identified channel or the identified video segment is not at least one of a channel of interest or a video segment of interest, adjusting one or more values related to transmitting fingerprints wherein the adjusted one or more values are operable to at least one of (i) transmit fingerprint packages enabling ACR detection sufficiently fast for detecting a channel to which the client is changed within at least one time proximity of the change of channel, (ii) at least one of halt or slow transmission of fingerprint packages until a channel change occurs, (iii) at least one of halt or slow transmission of fingerprint packages until a trigger time for an expected video segment of interest occurs, (iv) at least one of halt or slow transmission of fingerprint packages until a detection of an ad pod occurs, or (v) at least one of halt or slow transmission of fingerprint packages until a detection of a video segment of interest is detected by an ingest system associated with the ACR system.

34. The system of claim 26, further comprising:
- circuitry for signaling to transmit one or more fingerprint packages associated with the client to the ACR system based at least partially on the adjusted one or more values.

35. A computer program product, comprising:
- at least one non-transitory computer-readable medium including at least:
  - one or more instructions for receiving a first fingerprint package, the received first fingerprint package associated with a first timestamp, and retrieving at least one first match based at least partially on the received first fingerprint package, the at least one first match associated with a first video channel or video segment;
  - one or more instructions for receiving a second fingerprint package, the received second fingerprint package associated with a second timestamp, and retrieving at least one second match based at least partially on the received second fingerprint package, the at least one second match associated with a second video channel or video segment; and
  - one or more instructions for determining a difference in time between the first timestamp and the second timestamp and establishing a likelihood that at least one of the first match or the second match correctly identifies a video channel or video segment associated with a client sending the first and second fingerprint packages based at least partially on the determined difference in time, wherein differences in time correlate with different likelihoods of correct identifications.

36. The computer program product of claim 35, wherein at least some of the one or more instructions for receiving a first fingerprint package, the received first fingerprint package associated with a first timestamp, and retrieving at least one first match based at least partially on the received first fingerprint package, the at least one first match associated with a first video channel or video segment comprise:

one or more instructions for receiving a first fingerprint package sent by a smart television at least partially via the Internet, the received first fingerprint package associated with a first timestamp, and retrieving at least one first match based at least partially on the received first fingerprint package, the at least one first match associated with a first video channel or video segment.

37. The computer program product of claim 35, wherein at least some of the one or more instructions for receiving a second fingerprint package, the received second fingerprint package associated with a second timestamp, and retrieving at least one second match based at least partially on the received second fingerprint package, the at least one second match associated with a second video channel or video segment comprise:

one or more instructions for receiving a second fingerprint package, the received second fingerprint package associated with a second timestamp, and retrieving at least one second match from a media database associated with an Automated Content Recognition (ACR) system based at least partially on the received second fingerprint package, the at least one second match associated with a second video channel or video segment.

38. The computer program product of claim 35, wherein at least some of the one or more instructions for determining a difference in time between the first timestamp and the second timestamp and establishing a likelihood that at least one of the first match or the second match correctly identifies a video channel or video segment associated with a client sending the first and second fingerprint packages based at least partially on the determined difference in time, wherein differences in time correlate with different likelihoods of correct identifications comprise:

one or more instructions for determining a confidence interval based at least partially on a difference in time between the first timestamp and the second timestamp; and one or more instructions for establishing a likelihood that at least one of the first match or the second match correctly identifies a video channel or video segment associated with a client sending the first and second fingerprint packages based at least partially on the determined confidence interval.

39. A system, comprising:

circuitry configured for receiving a first fingerprint package, the received first fingerprint package associated with a first timestamp, and retrieving at least one first match based at least partially on the received first fingerprint package, the at least one first match associated with a first video channel or video segment;

circuitry configured for receiving a second fingerprint package, the received second fingerprint package associated with a second timestamp, and retrieving at least one second match based at least partially on the received second fingerprint package, the at least one second match associated with a second video channel or video segment; and circuitry configured for determining a difference in time between the first timestamp and the second timestamp and establishing a likelihood that at least one of the first match or the second match correctly identifies a video channel or video segment associated with a client sending the first and second fingerprint packages based at least partially on the determined difference in time, wherein differences in time correlate with different likelihoods of correct identifications.

* * * * *